United States Patent [19]

Okajima et al.

[11] Patent Number: 4,730,270
[45] Date of Patent: Mar. 8, 1988

[54] INTERACTIVE FOREIGN LANGUAGE TRANSLATING METHOD AND APPARATUS

[75] Inventors: Atsushi Okajima, Yokohama; Fumiyuki Yamano, Kawasaki; Eri Okamoto, Tokyo, all of Japan

[73] Assignee: Hitachi, Ltd., Tokyo, Japan

[21] Appl. No.: 756,708

[22] Filed: Jul. 19, 1985

[30] Foreign Application Priority Data

Jul. 31, 1984 [JP] Japan ................... 59-162448

[51] Int. Cl.⁴ .............................. G06F 15/38
[52] U.S. Cl. ........................ 364/900; 364/419
[58] Field of Search ... 364/200 MS File, 900 MS File, 364/300, 419

[56] References Cited

U.S. PATENT DOCUMENTS

| | | | |
|---|---|---|---|
| 3,934,226 | 1/1976 | Stone et al. | 364/200 |
| 4,270,182 | 5/1981 | Asija | 364/900 |
| 4,493,050 | 1/1985 | Hashimoto et al. | 364/900 |

*Primary Examiner*—Raulfe B. Zache
*Attorney, Agent, or Firm*—Antonelli, Terry & Wands

[57] ABSTRACT

A machine translation system for mechanically translating a first language into a second language which displays series of questions in the first language on a display screen of a display device. A user sequentially answers the questions for the translation system mainly in the first language. The translation system parses portions of the source sentence information answered by the user, and retrieves a dictionary film in the system on the basis of the results of parsing to make a composition in the second language. The user's answers may contain the second language. The interaction between the user and the translation system allows an original text in the first language to be composed and translated in the second language in the translation system.

10 Claims, 12 Drawing Figures

FIG. 3

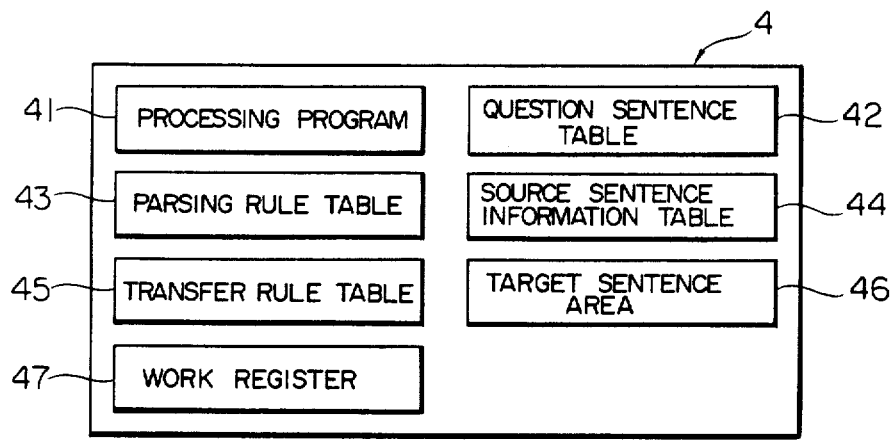

FIG. 5

| QUESTION NO. | QUESTION SENTENCE | ITEM CLASS | NEXT QUESTION NO. |
|---|---|---|---|
| 1 | NANIYO NO REPOTO KA ? (WHAT PURPOSE IS THIS REPORT USED FOR ?) | PURPOSE 010 | 2,3,4,5,6 |
| 2 | NANI WO SHITA KA ? (WHAT DID THE AUTHORS DO?) | MAIN THEME 100 | 7,8,9,10 |
| ⋮ | | | |
| 8 | NANI WO KAIHATSU SHITA KA ? (WHAT DID THE AUTHORS DEVELOP ?) | MAIN THEME 100 | 11 |
| ⋮ | | | |
| 11 | SORE WA DONNA TOKUCHO WO MOTSU KA ? (WHAT FEATURE DOES IT HAVE ?) | FEATURE 110 | 15 |
| ⋮ | | | |
| 900 | TA NI NOBERU KOTO WA NAI KA ? (IS THERE ANYTHING TO BE INDICATED ?) | PERORATION 900 | -1 |

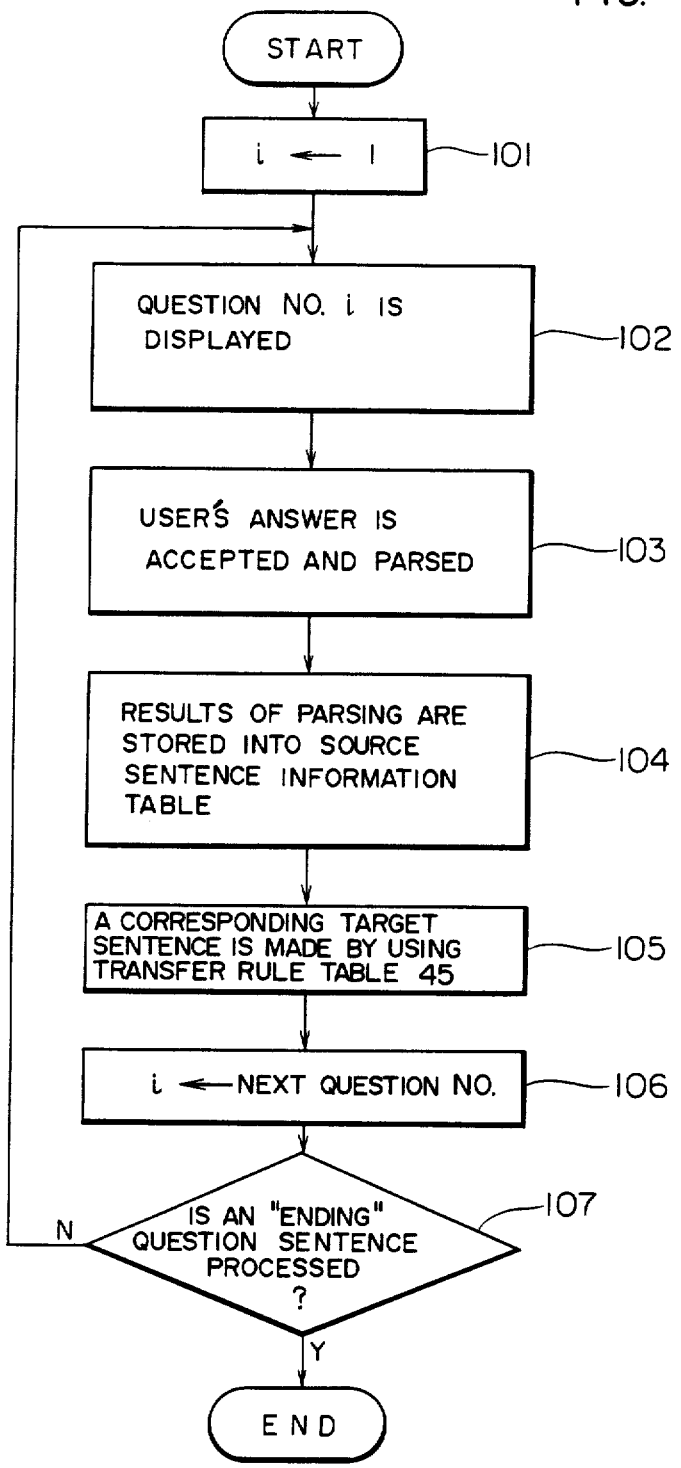

FIG. 6

| ITEM NO. | PARSING PATTERN |
|---|---|
| 1 | X YA Y |
| 2 | X WO Y DE |
| 3 | X (Y) |
| 4 | X KOTO |

FIG. 7

| ITEM NO. | ARRANGEMENT OF INPUT PHRASES | | | ARRANGEMENT OF OUTPUT PHRASES | | |
|---|---|---|---|---|---|---|
| 1 | (CHOSYA RA WA) SUBJ | ATARASHII... OBJ | (WO)KAIHA TSU SHITA GOV | (We) SUBJ | developed GOV | a new... OBJ |
| 2 | (SOREWA) SUBJ | KAGAKUGI JUTSUBUN... OBJ | (WO)HONYA KU SURU GOV | (it) SUBJ | translate GOV | technical... OBJ |

1. NANIYO NO REPOTO KA ? (What purpose is this report used for?)
   1. RONBUN(Article)   2. RONBUN NO ABUSUTORAKUTO(Abstract of article)
   3. TOKKYO(Patent)   4. GIJUTSU REPOTO(Technical report)
   5. KOKOKUBUN(Commercial message)
   <u>2</u>
2. NANI WO SHITA KA ? (What did the authors do?)
   1. TEIAN SHITA(Proposed)   2. KAIHATSU SHITA(Developed)
   3. JIKKEN SHITA(Experimented)   4. HAKKEN SHITA(Discovered)
   <u>2</u>
3. NANI WO KAIHATSU SHITA KA ? (What did the authors develop?)
   <u>ATARASHII(New) machine translation system</u>
4. DONNA TOKUCHO WO MOTSU KA ? (What feature does it have?)
   <u>DANPENTEKI TANGO KARA JIDOTEKI NI SAKUBUN SURU KINOU</u> (Automatic-composition facility from groups of words)
5. SARANI TOKUCHO WO MOTSU KA ? (Another feature does it have?)
   MOTEBA SHITA NI KAKU (If so, write it below)
   _____
6. NANI WO SURUMONO KA ? (What does it do?)
   <u>HONYAKU</u>(Translation)
7. DONNA MONO WO HANYAKUSURU(DEKIRU) NOKA ? (What does(can) it tanslate?)
   <u>KAGAKUGIJUTSU BUNKEN YA MANIYUARU</u>(Technical articles and/or manuals)
8. HOHO WA ? (How is it done?)
   <u>ARAKAJIME YOISHITA PATAN NI AUKA SHIRABERU</u> (By checking if it accords with a prepared pattern)
9. SEINO WA ? (What is a performance?)
   <u>1 BUN (HEIKIN 16 words) WO 2.5 BYO DE</u> (At a speed of 2.5 seconds per sentence(average 16 words))
10. KONGO NO KADAI WA ? (What is a future study?)
    <u>SYARETA BUN WO SEISEISURU KOTO</u>(To generate stylish sentences)

| WORD | PART-OF-SPEECH 1 | ... | TRANS-LATION | PART-OF-SPEECH 2 | DEFAULT VALUE |
|---|---|---|---|---|---|
| HONYAKU | VERB | ... | translate | $V_t$ | (OBJ) text/sentence |
|  | NOUN | ... | translation | N |  |
| SAKUBUN | VERB | ... | compose | $V_t$ | (OBJ) text/sentence |
|  | NOUN | ... | composition | N |  |

| ADDITION/CANCELLATION | ITEM CLASSIFICATION | SOURCE SENTENCE INFORMATION |
|---|---|---|
|  | MAIN THEME 100 | [CHOSYARA WA] ATARASHII machine translation system WO KAIHATSU SHITA ( [The authors] developed a new machine translation system.) |
|  | FEATURE 110 | [SORE WA] TANGO NO DANPEN KARANO GIDO-SAKUBUN-KIKO WO MOTSU([It] has automatic-composition-facility from groups of words.) |
| + | FEATURE 110 | [SORE WA] NANI WO UKETSUKETAKA NI TAISURU GIKO-SETSUMEI-KINOU WO MOTSU([It] has self-explanatory-facility from groups of words.) |
| − | OBJECT 120 | [SORE WA] HONYAKU SURU MONO DE ARU ([It] translates.) |
|  | FUNCTION 130 | [SORE WA] KAGAKUGIJUTSU WO HONYAKU SURU ([It] translates technical articles and/or manuals.) |
| − | METHOD 210 | [HOHO WA] ARAKAGIME YOI SHITA PATAN NI AUKA SHIRABERU([The method is] by checking if it accords with a prepared pattern.) |
|  | PERFORMANCE 310 | [SEINO WA] 1BUN (HEIKIN 16 words) WO 2.5 BYO DE (([The performance is] at a speed of 2.5 seconds per sentence(average 16 words).) |
|  | PROBLEM 810 | [KONGO NO KADAI WA] SYARETA BUN WO SEISEI SURU KOTO DE ARU ([The future study is] to generate stylish sentences.) |

INTERACTIVE FOREIGN LANGUAGE TRANSLATING METHOD AND APPARATUS

BACKGROUND OF THE INVENTION

This invention relates to an interactive foreign language translating method and apparatus for generating, from sentences of a composition, words, phrases, clauses, etc., in a first natural language, sentences or a composition in a second natural language.

Much research and development is occurring regarding systems for mechanically translating compositions from Japanese to English or from English to Japanese by means of computers. These systems are now in a form they can be put to practical use on condition that the subject matter to be translated is limited to particular kinds of compositions such as technical documents and manuals, and manual checks are utilized in the course of translation.

The prior art translation systems are grouped into the following three types:

The first type is an "electronic dictionary" in which the corresponding words are consulted.

The second type is one translating comparatively simple sentences as well as definite sentences and common sentences, in which with examples of these sentences previously stored, parts of the sentence being translated are replaced by other words and thereafter the entire sentence is translated. An example of this second type is an "electronic translating machine" disclosed in Japanese Patent Unexamined Publication No. 56-145461.

There has been also proposed a system in which after illustrative sentences have been provided, some changes about information, etc. are referred to the user. An example of this is disclosed in an article "one approach of on-line translation" by Fukushima and Arita, in the Information Processing Society of Japan, Natural Language Research Group Documents 41-5 (Jan. 26, 1984).

The third type is one translating complicated sentences of any sentence pattern by means of the parsing or syntactic analysis thereof. An example of this type is disclosed in Japanese Patent Unexamined Publication No. 55-102071.

The above three types of translation systems have the following problems, respectively.

The first type can translate compound words (common phrases of the pattern of noun plus noun) and set phrases, but not make compositions and only serves to economize the labor of manually consulting a dictionary.

The second type can make sentences through simple and easy methods. Since it is the user who selects illustrative sentences, however, the work of selection become complicated with the number of the illustrative sentences is increased. In order to obviate this, there have been methods for reducing the number of the illustrative sentences to be selected, by the classification thereof into fields of use or the provision of variable terms to similar illustrative sentences.

The third type does not require the work of selecting illustrative sentences, and so permits high quality translations even with numbers of the translation rules to be used and translatable illustrative sentences are increased. This type, however, has very great technical difficulty because of complexity of natural languages and so has a strong possibility of the failure in parsing. When this type of system is used for a general purpose, an output composition is not placed in a certain form of composition and is derived in the form substantially equal to literal translation.

On the other hand, abstracts and the like of articles and patents require the compositions to contain necessary information, and must be translated in foreign languages in large amount. Such abstracts are often subjected to mechanical retrieval.

A method suitable to translate such documents has been awaited.

SUMMARY OF THE INVENTION

An object of this invention, in order to overcome the drawbacks or problems of the prior art mentioned above, is to provide an interactive foreign language translation method which enables the making of a foreign language composition analogous to free translation and with a higher degree of perfection by means of a system collecting source sentence information about compositions to be translated, in such a way as to answer questions asked by a machine translation system for making foreign language compositions, but not by means of a system selecting illustrative sentences.

The other object of this invention is to provide an interactive foreign language machine translation system which enables the making of foreign language compositions analogous to free translation and with a higher degree of perfection.

In order to attain the above objects, an aspect of this invention is charactered by a machine translation system for making a foreign language composition having a dictionary file in which a first natural language and a second natural language are referred to each other and a display device, wherein a series of questions by the first natural language on the assumption of a certain composition are displayed on a display screen of the display device, source sentence information answering the questions in mainly the first natural language is collected, the collected source sentence information is subjected to parsing or syntactic analysis, and finally the dictionary file is referred to on the basis of the result of parsing to make a second language composition.

This invention is also characterized in that the user inputs, source sentence information as essential words of an original text in such a way as to answer the questions asked by a machine translation system, thereby permitting the translation system itself to make a composition to be the original text and translate the composition.

The interactive foreign language translating method and apparatus in accordance with this invention enables the making of a foreign language translation analogous to free translation and with a higher degree of perfection by means of a system collecting source sentence information about a composition to be translated, in such a way as to answer questions asked by a machine translation system for making a foreign language composition, but without of a system for selecting illustrative sentences.

BRIEF DESCRIPTION OF THE DRAWINGS

FIG. 3 shows an arrangement of allocations of the main memory illustrated in FIG. 1;

FIG. 4 is a flow chart of one embodiment in accordance with this invention;

FIG. 5 shows one example of the question sentence table in FIG. 3;

FIG. 6 shows one example of a parsing pattern;

FIG. 7 shows one example of the transfer rule table in FIG. 3;

FIG. 8 shows one example of the flow of questions and answers;

FIG. 9 shows one example of the contents of the dictionary file in FIG. 1;

FIG. 10 shows one example of the contents of the source sentence information table in FIG. 3;

DESCRIPTION OF THE PREFERRED EMBODIMENTS

One embodiment in accordance with this invention will be explained below with reference to the accompanying drawings.

Figure 1:
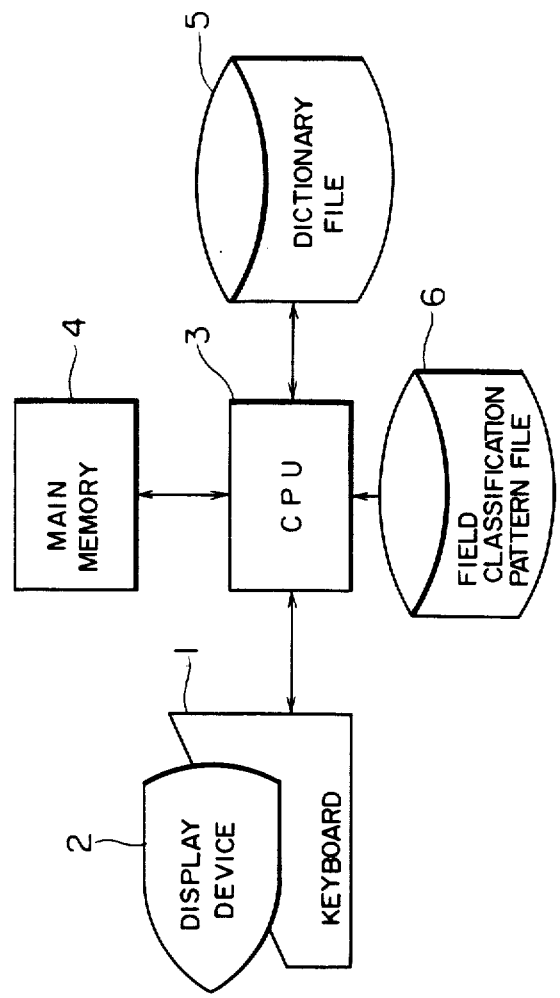
FIG. 1 is a block diagram of a machine translation system for making a foreign language composition in accordance with one embodiment of this invention.

FIG. 1 is a block diagram of a machine translation system for making a foreign language composition (hereinafter referred to as simply translation system) in accordance with one embodiment of this invention. In FIG. 1, numeral 1 denotes a keyboard for inputting first language information, etc. by an operator; 2 is a display device for displaying target sentences, question, etc.; 3 is a CPU which serves to perform translation processing and output control 4 is a main memory in which several kinds of information are stored, allowing high speed data transfer between it and CPU, 5 is a dictionary file in which a first natural language and a second natural language are referred to each other 6 is a field classified pattern file in which are stored a series of questions patterned in field classification and made on the assumption of the composition suitable to the pertinent field.

Figure 2:
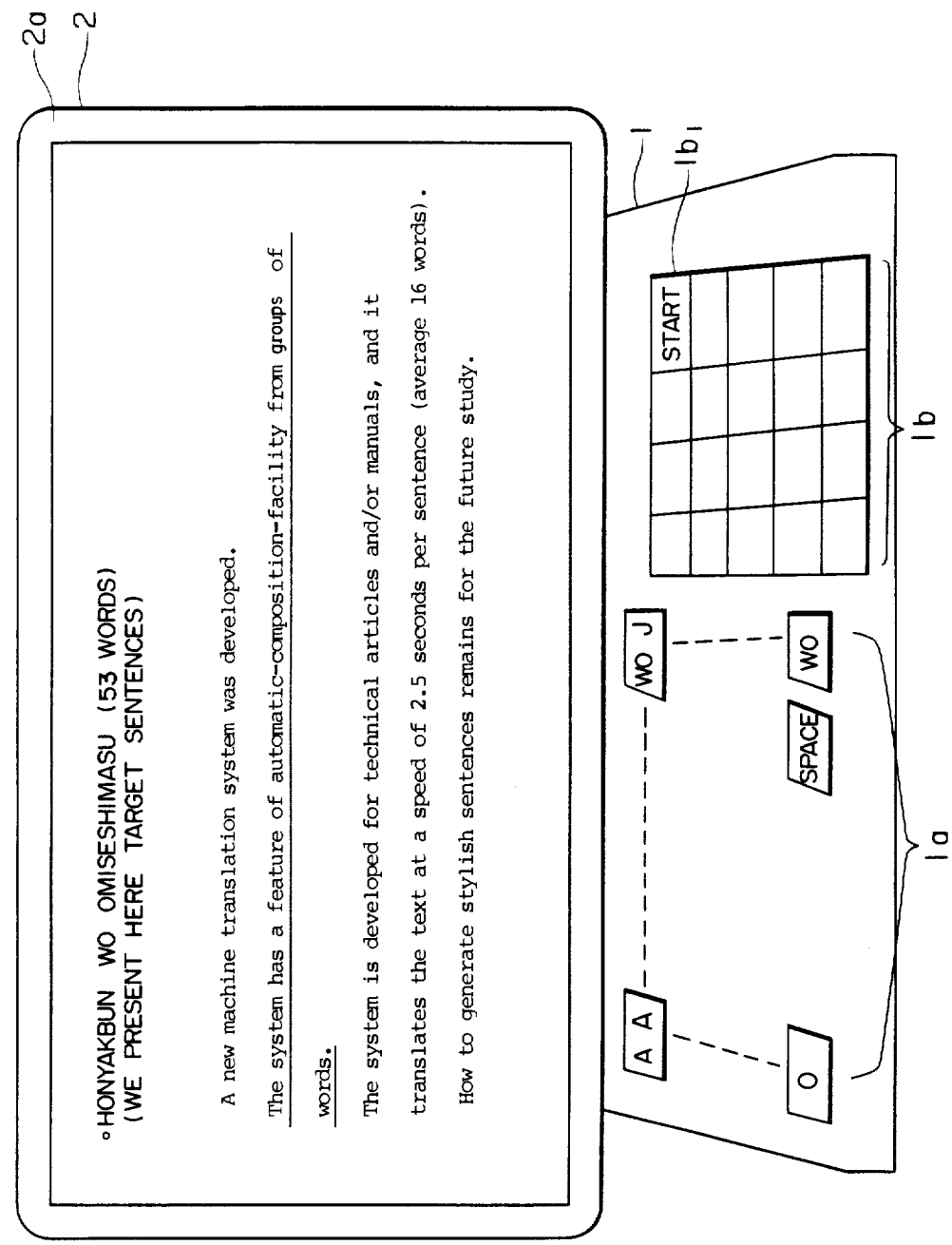
FIG. 2 shows the input device and the display device illustrated in FIG. 1.

FIG. 2 is a schematic diagram of the construction of the keyboard 1 and the display device, illustrated in FIG. 1. The keyboard 1 has character keys $1a$ for inputting character codes, and function keys $1b$ for inputting therefrom codes for selectively indicating functions required for translation, collecting information required for translation, etc. The function keys include a starting key $1b_1$. The display device displays data output from the CPU 3 on its screen $2a$.

FIG. 3 shows an arrangement of allocations of memory regions in the main memory 4 illustrated in FIG. 1. The main memory 4 includes a processing program 41 for executing algorithms for translation, a question sentence table in which a series of questions on the assumption of a certain composition are stored, a parsing rule table 43 in which rules for parsing the answers to the questions, are stored, a source sentence information table 44 for storing the source sentence information (answers) parsed by the parsing rule table 43, a transfer rule table 45 in which rules for transferring the parsed language information into target sentences are stored, a target sentence area 46 for storing the target sentence, and a work register 47.

The processing operation of this embodiment will be explained below. This embodiment will be mainly explained with respect to the case where it is used as an "English composer" which performs questions and answers in Japanese to make an English composition. However, it goes without saying that this invention can be generally used as a foreign language composer including a "Japanese composer" so that Europeans and Americans can make Japanese compositions for Japanese. This invention can be applied to translation between Esperanto, which is an antificial language, and other natural languages. Thus, it should be noted that the term "language" or "foreign language" also implies an artificial language such as Esperanto, through this specification.

In FIG. 2, first, the starting key $1b$ is pressed down by a user, and then the CPU 3 actuates the processing program 41. The processing program 41 performs the following three processings in its board classification:

1. Collection of source sentence information by questions and answers,
2. Display of the source sentence information and amendment thereof,
3. Generation of target sentences and display thereof.

Hereafter, these processings will be explained in detail.

I Collection of source sentence information by questions and answers thereto:

FIG. 4 is a flow chart of this processing.

The collection of source sentence information is performed in such a way as to derive answers to question sentences previously prepared, an example of which is shown in FIG. 5. These questions, as seen from FIG. 5, are stored in a table form together with numbers thereof (hereinafter referred to question No.), term classification thereof and next question Nos.

The whole question consists of a series of question sentences made on the assumption of a certain composition as if when a public prosecutor asks a suspect leading questions to force him to confess his crime, the public prosecutor sequentially obtains from the suspect the information which causes the suspect to confess his crime. This is because the composition made for a certain purpose has a unique composition structure corresponding to the purpose. Each question sentence is also constructed so as to provide an answer consisting of words only, noun phrases, or combination of noun phrases and simple postpositional words. Missing of important terms, which is liable to occur in composition, is prevented by carefully considering the structure of the question sentence to obviate missing of the constituents thereof.

The question sentences are allowed to be previously stored in the question sentence table 42, but in order to make their versatility it is preferable that with the question sentences previously stored in the field classification pattern file 6, they are stored in the main memory after the field thereof has been clarified.

In the processing with reference to FIG. 4, first, 1 is set to a variable 1 representing a question No. (step 101). Next, the question sentence having the question No. of the above variable (now 1) is displayed on the display device 2 (step 102). Here, the processing program 41 waits for a user's answer. The user inputs the answer from the keyboard 1 in the form of words, and fractional phrases or clauses. The processing program 41 accepts the answer, and parses it by using the contents of the dictionary file 5 and the parsing rule table 43 (step 103).

The parsing, when the answer has been obtained by the number corresponding to one of the answer choices presented at the time of asking a question, can be performed only by recognizing the number. In this embodiment, the answer is often provided by only words, noun clauses or a combination of noun clauses and simple postpositional words, and so in most cases, the parsing is simple, which reduces the possibility of erroneous parsings.

FIG. 6 shows an example of the parsing of the answer provided. In the figure, underlined words are key words in the parsing, and X, and Y are words, noun phrases, etc. other than the key words. Preferably, the key words, for their discrimination from the words or phrases contained in X, Y, should be provided with discrimination information, e.g., the above underlined words have a higher brightness or different color on the display screen 2a when inputting the key words. Since in this embodiment, the object of parsing is answers to the questions, the contents of the answers can be estimated to a certain extent and so the possibility of failure in the parsing is reduced. The parsing also enables the making of a foreign language composition analogous to free translation and with a higher degree of perfection.

Returning to FIG. 4, the parsed contents are stored in the source sentence information table 44 (step 104). The source sentence information is derived from the source sentence information table 44 and transferred into target sentences by using the transfer rule table 45 (step 105). As a system for transfer, a simple system as disclosed in Japanese Unexamined Publication No. 56-85722 can be adopted.

FIG. 7 shows an example of the transfer rule table 45 in accordance with the system of applying a word order and inflections (postpositional words in the case of English-Japanese) on the basis of an arrangement of phrases, adopted in this embodiment.

As shown in FIG. 7, the input answers are parsed and on the basis of the parsing results they are stored in the terms of SUBJ (subject), OBJ (object), GOV (predicate), etc. With respect to the first line, "ATARASHII (new) machine translation system" input as an answer is parsed and stored in the term of OBJ. The arrangements of input phrases and output phrases depend upon different grammers in Japanese and English, i.e., in the input Japanese a predicate is located at a sentence end like the word order of subject+object+predicate, while in the output English, the predicate follows the subject like the word order of subject+predicate+object.

Returning to FIG. 4, the variable i mentioned above is reset to the number stored in the column of "next question No." corresponding to the i-th question sentence (step 106). And checking is made whether or not the variable is a code indicating 'END', which may be discriminated by a value of −1, for example; if it is 'END', the processing of source sentence information collection is ended, and if not, this processing is returned to step 102 and subsequently, necessary source sentence information is sequentially collected on the basis of the question sentences to make a previously assumed composition (step 102 to 107).

One example of the questions and answers in the interaction between the translation system, and the user is shown in FIG. 8.

The answer at "3" in FIG. 8 and the answer used in the explanation of FIG. 7 contains a mixture of Japanese and English. They are discriminated by the difference between a full font (16 bit) code and half font (8 bit) code as well as by the encircling thereof with predetermined codes thereby to check if they should be translated or output as translation results as they are. The mixed locations of Japanese and English permits reduction of the processings of retrieval of the dictionary file 5, etc. in the case where a user is more familiar with English technical terms than the translation system and literal translation results in an erroneous translation, or the target sentence has several meanings so that the user must select one of them. Thus, by collecting source sentence information to be translated through an interactive system and permitting the presence of a translation target language in the source sentence information, an efficient foreign language composing machine with an user's knowledge effectively used is provided.

The word "HONYAKUSURU" (translate) in question No. 7 in FIG. 8 is formed from the information provided by the answer to question No. 6 by using the dictionary file 5 such as shown in FIG. 9. More specifically, although the answer "HONYAKU" (translation), the answer to question No. 6, is a noun, the corresponding verb "HONYAKUSURU" (translate) is selected as the result of retrieval of the dictionary file 5 and on the basis of this, question No. 7 including the verb is formed. In this way, in this embodiment, the subsequent question is asked partially considering the answer to the previous question so that plural questions as shown in FIG. 8 may be simultaneously displayed on the display screen 2a according to the manner of question and the kind of composition although this manner of display was not adopted in this embodiment.

FIG. 10 shows one example of the source sentence information table 44, represented by a natural language, in which the source sentence information provided by the questions and answers indicated in FIG. 8 is stored. The contents actually stored in the source sentence information table 44 may be represented by natural languages or by an artificial language such as Esperanto, or may be compressed forms. The compressed form may be logical expressions such as predicates in a calculus or logic. Moreover, when the presessing program 41 is capable of restoring a complete composition from item classifications and default values, only fractions themselves of information may be stored in the source sentence information table 44. For example, the first line in FIG. 10 may have an expression "Develop (the authors, new machine translation system)" in the predicate or alternatively may have a fractional expression "new machine translation system". After all, the source sentence information table 44 means an accumulation of essential words of a composition by the information provided by the answers. Thus, in this invention, the essential words of a composition are input by the authors themselves, and the accumulation of the essential words input is stored in the source sentence information table 44. It should therefore be noted that by sequentially storing the data stored in the source sentence information table 44 into an external memory device, the essential words of a composition which are applicable to the retrieval, abstracting, etc. of a target sentence are spontaneously accumulated.

Incidentally, in FIG. 10, the source sentence information corresponding to the column of "addition/cancellation" marked with (+) represents that a user hopes a further addition to the processing of collecting source sentence information by questions and answers in FIG. 8. This will be explained later.

In FIG. 10, the parts parenthesized by [ ] marks are previously stored in the question sentence table 42, etc. as default values by a translation system. The default values permit a user to reduce his labor of inputting and permit the supplementation of the source sentence information required when translating Japanese, which is often used without subjects and objects, into English. Moreover, in FIG. 9, as shown in the column "default value" corresponding to the term "HONYAKU", for example, it is preferable that the word required to generate a target sentence is stored for the case likely to be omitted, as a default value. More specifically, with respect to a verb "HONYAKUSURU" (translate), the word corresponding to its objective case is often omitted so that the word corresponding to the objective case of "HONYAKUSURU" (translate), i.e., text or sentence is previously stored in the column "default value" corresponding to the term "HONYAKUSURU" (translate).

Figure 12:
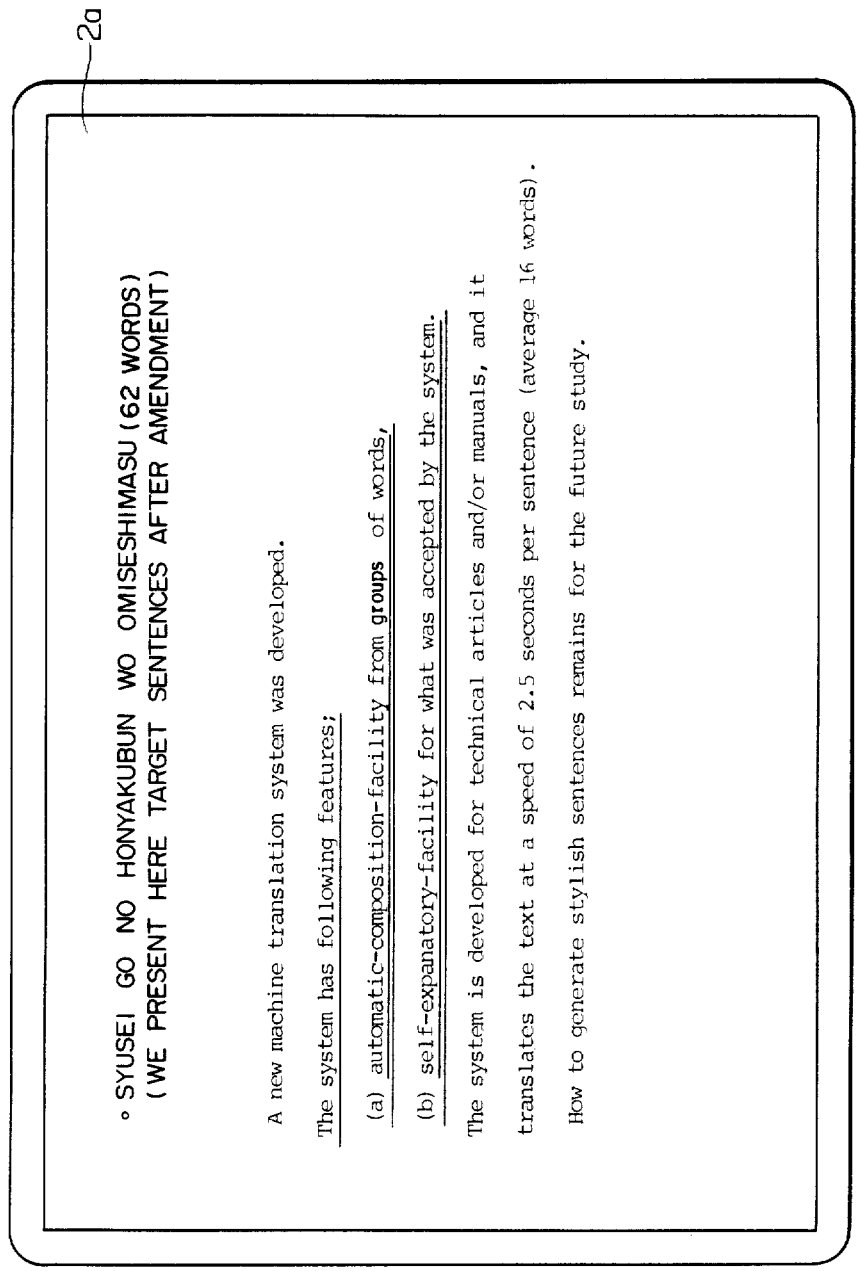
FIG. 12 shows one example of display of a completed target sentence.

Furthermore, the display screen 2a of the display device 2 in FIG. 2 exemplifies target sentences generated on the basis of the source sentence information shown in FIG. 10, but actually, this target sentence is not displayed in this embodiment (It should be noted that this target sentence does not contain the source sentence information corresponding to the column "addition/cancellation" marked with "+" or "−" in FIG. 10. The target sentence supplied with the pertinent source sentence information by the processing mentioned below is shown in FIG. 12, which is actually displayed). As a matter of course, it is effective to actually display the display screen 2a of FIG. 2 where users are assumed to be ones capable of understanding English to a certain extent.

The processing program 41, after having collected source sentence information through questions and answers, shifts to the next processing explained below.

Figure 11:
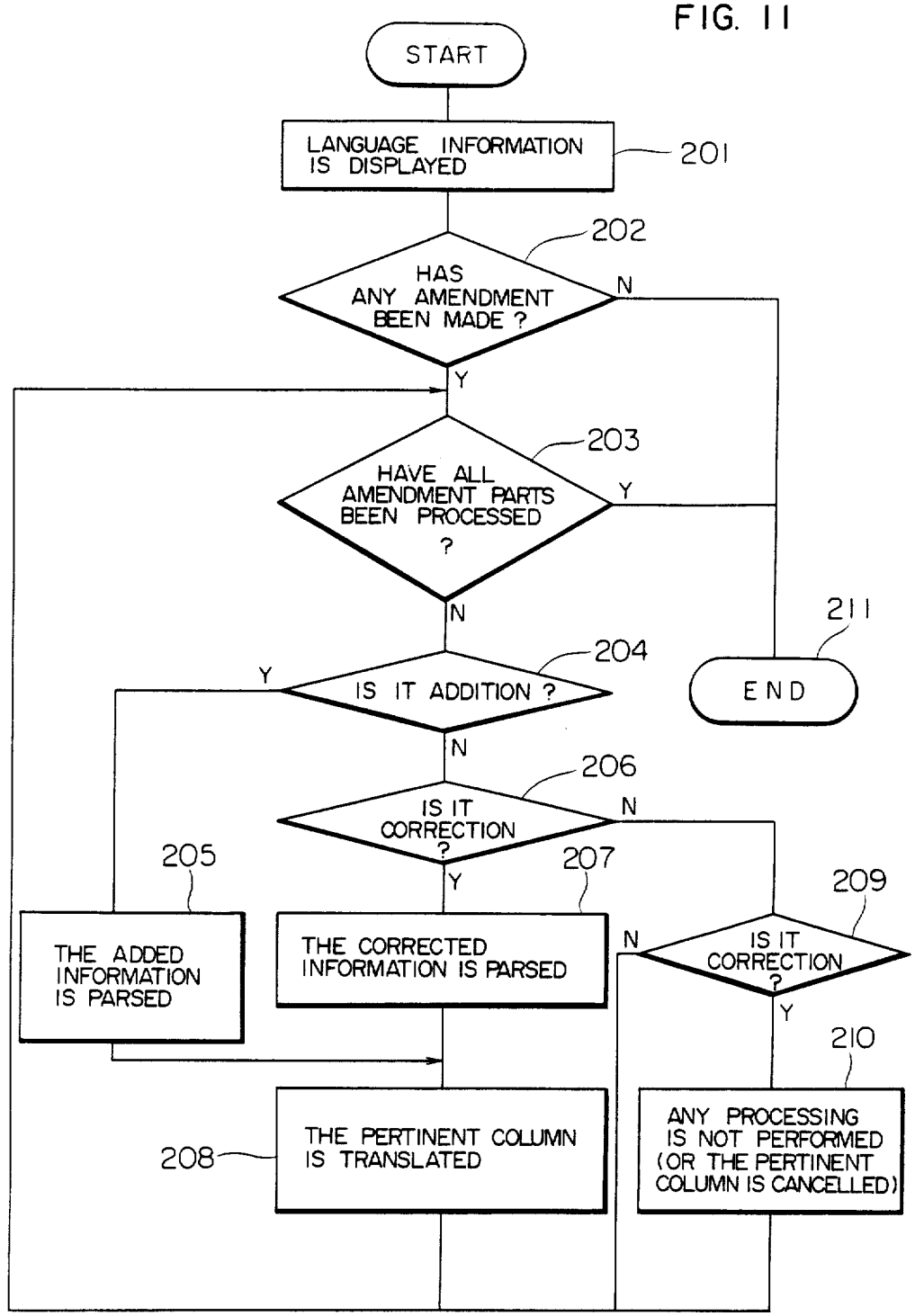
FIG. 11 is a flow chart of one embodiment of amendment processing of the source sentence information.

II Display of source sentence information and amendment thereof:

FIG. 11 is a flow chart of the processing of displaying the collected information for a user and amending it.

First, the contents of the source sentence information table 45 is displayed on the display device, with the answers (source sentence information) classified corresponding to respective questions (step 201). Here, the processing program 41 waits for the user to input an editing inputs of addition, cancellation and correction for the answer (source sentence information) to each question.

When the user inputs the amendment inputs and a code indicating the end of input from the keyboard 1, the processing program 41 checks if the amendments have been made (step 202). In the case of addition, the contents of the Japanese text indicating columns of the added source sentence information are parsed (steps 204 and 205). In the case of correction, only the corrected parts of the Japanese text indicating column or the whole sentence of the pertinent column (steps 206 and 207). Further, in the case of addition, the pertinent Japanese text is translated while in the case of correction, it is retraslated (step 208).

In the case of cancellation, any processing is not performed (steps 209 and 210). In this case, it is preferable to assure that the pertinent line is not displayed, in displaying the target sentences, under the recognition of the "cancellation" code stored in the "addition/cancellation" column and can be displayed again only when the restoration of the cancelled sentence is hoped under the restoration mode. However, in the case where because of many additions to be made, shortage of the table capacity is estimated, the pertinent column may be cancelled to effectively use the source sentence information table 45.

In the case requiring no amendment, any amendment of the source sentence information provided by the pertinent question is not made, and the processing is shifted to the question of the subsequent line.

The processings mentioned above are performed for each line. And when a judgement that all edited parts has been processed is made, the amendment of the source sentence information by the user is regarded as ended. Thus, the processing of the amendment is ended (steps 203 and 211).

FIG. 12 shows the target sentence including the results of the processing of II performed as shown in the "addition/cancellation" column of FIG. 10.

Moreover, where in the case of addition, the target sentence information belonging to the same "item classification" is added, the code of "item classification" column shown in FIG. 10 as well as the target sentence information to be added is also input by the user. This code is stored in the work register 47. Thus, in FIG. 10. for example, the processing program 41 recognizes that the second question and the third question fall into the same item classification so that two sentences are thrown into one as underlined in FIG. 12 although the second question only provides the target sentence as underlined in FIG. 2. It is generally difficult to perform a processing of throwing two similar sentences into one but this can be performed for the sentences dedicated to a limited purpose. For example, the translating machine previously knows from the flow of having presented questions that the part underlined in FIG. 12 is a summary of a technical article and explains the function of the developted system. Thus, in a such limited case, by preparing an output pattern in which only two similar sentences, doubly underlined parts (a) and (b), are considered to be an amendment, it is easily possible to throw two similar sentences into one, as underlined in FIG. 12.

III Generation of target sentences and display thereof:

Finally, the processing program 41 displays the completed target sentence on the display device 2; although in this embodiment the target sentence was generated in association with (1) Collection of source sentence information by questions and answers and (2) Display of the source sentence information and amendment thereof, it may be made after the contents to be translated has been decided (in the above example, after the source sentence information shown in FIG. 10 for providing the output shown in FIG. 12 has been decided).

In this embodiment, as seen from FIG. 10, the information provided by the answers of an operator, i.e., contents of the language information table 44 was explained to be represented in the form analogous to a natural language. Where the contents of the source sentence information table 44 are analogous to a logical expression, however, the rules contained in the transfer rule table 45 are in the form of predicates of a predicate calculus or logic in the left side in FIG. 7. Moreover, where the source sentence information table 44 stores only fractions of information, by applying the transfer rules after they have been restored to complete predicates or sentences, the translated sentence or target sentence can be provided.

Further, although the explanation was made on the assumption that in this embodiment, all the contents of the source sentence information table 44 shown in FIG. 10 are translated as they are, it is possible to make and provide a title or heading by adding a question about "choice of output form" to the questions to a user (for example a user replies "+ABSTRACT" for the information in FIG. 10), and supplying the heading of an output sentence (in the case above, "ABSTRACT"). It is also possible to make a title even an abstract summary of the text on the basis of the contents of the source sentence information table 44.

The target sentence can be fall into a certain length or range by the method in which "inportance degree" columns are provided in the source sentence table of FIG. 10 a user is caused to previously input the length of a composition, e.g. 400 words the target sentences are made in order from the source sentence with a higher importance degree and when the target sentence reaches a predetermined length, they cease to be made. Where the length of the target sentence once made is required to be changed, the sentences to be translated can be lengthened/shortened in accordance with their importance degree, or the sentences with the once cancelled codes stored can be restored so as to be lengthened.

In this way, in this embodiment of this invention, a Japanese composition directly made by a user is not translated, but information of Japanese is collected from the questions by a translation system and the answers thereto and on the basis of the information collected a foreign language composition is automatically made by a translation system so that a preliminary training specific to the translating system is not required.

Furthermore, in this embodiment of this invention, the contents of the source sentence information table 44 provided by the answers of an operator are an abstract or essence of the meaning of the composition made by the authors. Therefore, the following advantages will be obtained through simple means.

(1) By storing the above contents in a data base, a file containing the contents which are more accurate than the target sentences is provided.

(2) Where an article of a long composition is translated, when other operators input to a translation system a question, e.g., "What method is disclosed in this article?", the translation system can answer the question without performing a difficult and costly operation of parsing the whole text expressed and thereafter extracting the meaning. For example, in FIG. 10, only displaying the part of the item classification 210 suffices for the answer.

(3) Almost all the information shown in FIG. 10 (answers by a user, as shown in FIG. 8) except the information prepared with default values are key words of the completed target sentence, and so the use thereof enables easy performance of automatic keyword abstracting and automatic indexing.

What is claimed is:

1. An interactive foreign language translating method performed by a machine translation apparatus which includes a central processing unit for performing translation processing, input means coupled to said central processing unit, output means coupled to said central processing unit and said input means, a main memory coupled to said central processing unit, a dictionary file coupled to said central processing unit, and a field classified pattern file coupled to said central processing unit, said method comprising the steps:
  asking a user, by said central processing unit, a series of questions in a first language read out from said field classified pattern file;
  collecting, by said central processing unit, in said main memory, source sentence information answers by the user from said input means to said questions in the first language;
  parsing, by said central processing unit, the source sentence information collected in said main memory; and
  making, by said central processing unit, a composition in a second language on a basis of results of the parsing by utilizing said dictionary file.

2. An interactive foregin language translating method according to claim 1 wherein said questions and the answers thereto are performed in an interactive manner.

3. An interactive foreign language translating method according to claim 1, wherein said questions in said asking step and the composition in said composition making step are outputted to an output device.

4. An interactive foreign language translating method according to claim 3, wherein said output means is a display device having a display screen for displaying said series of questions in said asking step and the composition in said composition making step.

5. An interactive foreign language translating method according to claim 3, further comprising the steps of:
  collecting amendment information input by the user as a result of checking the composition output to said output means; and
  performing a parsing on the basis of said amendment information again to amend said composition.

6. An interactive foreign language translating method according to claim 3, further comprising the step of outputting a number of words.

7. An interactive foreign language translating method according to claim 1, wherein said answers may contain the second language as well as the first language.

8. An interactive foreign language machine translation apparatus having a dictionary file in which a first language and a second language are referred to each other, comprising:
  a first memory area for storing a series of questions in the first language;
  output means for outputting the series of questions stored in the first memory area;
  input means, coupled to said output means, for inputting answers made by a user to said series of questions, in the first language;
  a second memory area for storing source sentence information answered by the user; and
  means, coupled to said dictionary file said first memory area, said output means, said input means and said second memory area, for parsing the source sentence information stored in the second memory area and retrieving said dictionary file on a basis of results of parsing to make a composition in the second language to be outputted to said output means.

9. An interactive foreign language machine translation apparatus according to claim 8, wherein said output means is a display device having a display screen for displaying said series of questions and the composition.

10. An interactive foreign language machine translation apparatus having a dictionary file in which a first language and a second language are referred to each other, comprising:
  a first memory area for storing a series of questions in the first language;
  output means for outputting the series of questions stored in the first memory area;

input means, coupled to said output means, for inputting answers made by a user to said series of questions, in the first language;

a second memory area for storing source sentence information answered by the user; and means, coupled to said dictionary file said first memory area, said output means, said input means and said second memory area, for parsing the source sentence information stored in the second memory area, and retrieving said dictionary file on a basis of results of parsing to make a composition in the second language to be outputted to said output means, said parsing means further collecting amendment information inputted by the user through said input means as a result of checking the composition output to said output means, whereby said parsing means can perform a parsing again on a basis of said amendment information.

* * * * *